(12) United States Patent
Prulhiere et al.

(10) Patent No.: US 8,211,315 B2
(45) Date of Patent: Jul. 3, 2012

(54) FLUID SEPARATION MICROSYSTEM

(75) Inventors: Jean-Paul Prulhiere, Bordeaux (FR); Virginie Saavedra, Arcachon (FR)

(73) Assignee: Commissariat a l'Energie Atomique, Paris (FR)

( * ) Notice: Subject to any disclaimer, the term of this patent is extended or adjusted under 35 U.S.C. 154(b) by 1008 days.

(21) Appl. No.: 12/095,313

(22) PCT Filed: Nov. 27, 2006

(86) PCT No.: PCT/EP2006/068949
§ 371 (c)(1),
(2), (4) Date: May 28, 2008

(87) PCT Pub. No.: WO2007/063048
PCT Pub. Date: Jun. 7, 2007

(65) Prior Publication Data
US 2008/0302734 A1    Dec. 11, 2008

(30) Foreign Application Priority Data
Nov. 29, 2005 (FR) ..................... 05 12096

(51) Int. Cl.
*B01D 17/02* (2006.01)
*B01D 19/00* (2006.01)

(52) U.S. Cl. ............ 210/739; 210/96.1; 210/143; 96/1; 96/8; 96/241; 96/260

(58) Field of Classification Search .................... 95/1, 8, 95/12, 13, 23, 46, 241, 260; 96/156, 204, 96/414, 422, 423, 6, 155, 417; 210/739, 210/96.1, 143
See application file for complete search history.

(56) References Cited

U.S. PATENT DOCUMENTS

| | | | |
|---|---|---|---|
| 4,976,754 A | 12/1990 | Edelstein et al. | |
| 6,100,541 A * | 8/2000 | Nagle et al. | 250/573 |
| 6,261,462 B1 | 7/2001 | Batten | |
| 6,852,216 B2 * | 2/2005 | Moscaritolo et al. | 210/85 |
| 7,671,987 B2 * | 3/2010 | Padmanabhan et al. | 356/338 |
| 2006/0062698 A1 * | 3/2006 | Foster et al. | 422/101 |

FOREIGN PATENT DOCUMENTS

| | | |
|---|---|---|
| EP | 0708331 A1 | 4/1996 |
| WO | 9714027 | 4/1997 |
| WO | 2004004637 A2 | 1/2004 |

OTHER PUBLICATIONS

International Search Report, Application No. PCT/EP2006/068949, dated Apr. 23, 2007.

* cited by examiner

*Primary Examiner* — Nam Nguyen
*Assistant Examiner* — Paul J Durand
(74) *Attorney, Agent, or Firm* — Nixon Peabody LLP

(57) ABSTRACT

A microsystem for separating fluids not miscible with each other and contained in a mixture. The microsystem comprises at least one detection means intended to inspect at least one area of the mixture and to detect the presence of at least one of the fluids in this area. The microsystem further comprises at least one controlled means for opening or closing a passage. The microsystem further comprises at least one control means for the opening or the closing of a passage as a function of the nature of the fluid detected in the area inspected by the detection means, in such a way that the fluid whose presence has been detected flows or not through the passage. The detection means comprise a plurality of sensors arranged substantially around the controlled means.

25 Claims, 4 Drawing Sheets

FLUID SEPARATION MICROSYSTEM

CROSS REFERENCE TO RELATED APPLICATIONS OR PRIORITY CLAIM

This application is a national phase of International Application No. PCT/EP2006/068949, entitled "FLUID SEPARATION MICROSYSTEM", which was filed on Nov. 27, 2006, and which claims priority of French Patent Application No. 05 12096, filed Nov. 29, 2005.

TECHNICAL FIELD

The present invention concerns a microsystem for separating fluids that are not miscible with each other and contained in a mixture. This microsystem is particularly suited to separating a gas and a liquid when the weight and volume constraints of the microsystem are important. The present invention further concerns a device for separating fluids comprising at least one microsystem for separating fluids of the present invention.

STATE OF THE PRIOR ART

In numerous industrial fields, it is necessary to separate different fluids contained in a mixture. Different techniques are used to achieve this separation, such as for example distillation, fluid expansion, or even centrifugation. However the devices employing such techniques are bulky.

When the weight and volume constraints are important, for example when the dimensions of the device having to carry out this separation have to be of around one millimeter or less, the existing integrated and/or compact devices carrying out this separation use passive solutions, such as porous membranes constituted of separants and drains. The separants are, for example, structured surfaces comprising calibrated openings. In the case of a separation of a gas and a liquid, the separants allow, for example, the gas to pass and block the liquid. Expanded polytetrafluoroethylene, better known under the trade name Gore-Tex™, enables such membranes to be produced.

In these passive systems, the displacement of fluids, during their separation, may be obtained, for example, by differential pressure variation between two areas separated by a membrane as described previously, by dissymmetric variation of the hydrophobicity of the membrane, or instead by application of an electric field acting on one or several fluids, during an electrophoresis or an electro-osmosis.

The openings, or pores, of a membrane used for such a separation of fluids, must be of very small dimensions, typically around several nanometers. These dimensions are necessary so that, for example during a separation of a gas and a liquid, the gas can escape through the pores and not the liquid. However, this very often leads to a saturation of the pores by the liquid, preventing the passage of the gas through the pores. The separation of the gas and the liquid is then interrupted. Furthermore, the design and production of these passive systems depend on the fluids that are present. These systems therefore do not have a polyvalent operation enabling several mixtures comprising different fluids to be separated. For example, a system separating a mixture of two liquids will not necessarily be able to separate a different mixture, for example of gas and liquid.

DESCRIPTION OF THE INVENTION

The aim of the present invention is to propose a microsystem for separating fluids that does not have the above mentioned drawbacks, in other words a microsystem for separating fluids that is not bulky, that can operate with mixtures of fluids of different natures, and having openings that are not blocked by one of the fluids of the mixture during their separation.

To attain these aims, the present invention proposes a microsystem for separating fluids that are not miscible with each other and contained in a mixture, comprising:

- at least one detection means intended to inspect at least one area of the mixture and to detect the presence of at least one of the fluids in this area,
- at least one controlled means for opening or closing a passage,
- at least one control means for the opening or the closing of the passage as a function of the nature of the fluid detected in the area inspected by the detection means, in such a way that the fluid whose presence has been detected flows or not through the passage.

Thus, instead of using a passive solution for separating fluids of the prior art, a microsystem for separating fluids is used that operates in an active manner, enabling a dynamic management of the opening or the closing of a passage through which one of the fluids to be separated from the mixture can flow, thereby preventing a possible blocking of the passage by one of the fluids during the operation of the microsystem. Furthermore, when this microsystem is not operating, none of the fluids of the mixture can pass through the microsystem, even if the mixture is located inside a pressurised recipient.

Furthermore, since this microsystem has very little bulk, it may be used in situations where the weight and volume constraints are very important, as well as in difficult environments.

Microsystem is taken to mean, here and in the remainder of the document, a system integrating, in other words including, on the micrometric scale, mechanical and/or electronic components.

The fluids may be a gas and a liquid, or two liquids. Indeed, the microsystem of the present invention enables operation with mixtures of different nature, independently of the types of liquids and gases.

The microsystem may be formed in MEMS (Micro Electro Mechanical System) micro-TAS (Micro Total Analysis System) technology.

The controlled means may comprise a valve, such as a diaphragm or curtain valve.

The controlled means are preferably arranged near to the detection means.

The detection means may comprise at least one sensor, such as a microwave sensor, based on the electrical or thermal, optical or chemical conductivity.

The control means may be integrated in the detection means.

The detection means may comprise a plurality of sensors arranged substantially around the controlled means.

In this case, the sensors may be arranged substantially on concentric circles of different diameters and having for centre the controlled means.

The sensors arranged on a same circle may then be on a diameter of the circle, or form the summits of a regular polygon inscribed in the circle.

The sensors placed on different circles may be radially offset two by two.

The microsystem may be formed by etching, such as a chemical or laser etching, or by machining of a substrate.

The microsystem may be based on a semi-conductor, such as silicon, or polymer.

The present invention further concerns a device for separating fluids not miscible with each other and contained in a mixture, comprising at least one microsystem, subject of the present invention, and a support, the microsystem being arranged on one face of the support.

The passage of the microsystem may be arranged opposite a hole crossing through the support.

The microsystem may be fixed for example by welding, with adhesive, or by molecular adhesion, on the face of the support.

In an alternative, the device may be a recipient intended to contain the mixture, the support being at least one wall of this recipient.

In another alternative, the support may be a cover, intended to cover a recipient containing the mixture.

In yet another alternative, the device may be a pipe in which the mixture is intended to circulate, the support being at least one wall of this pipe.

The microsystem may then be arranged outside of the recipient or the pipe.

The present invention further concerns a method for separating fluids, not miscible with each other and contained in a mixture, by means of a microsystem, subject of the present invention, comprising:
- a step of detecting the presence of at least one fluid in the area of the mixture intended to be inspected by the detection means,
- a step of acquiring by the control means at least one detection signal for the presence of the fluid in the inspected area, delivered by the detection means,
- a step of processing the detection signal by the control means, which then deliver to the controlled means a signal for opening or closing the passage as a function of the detection signal received, and
- a step of opening or closing the passage by the controlled means as a function of the signal received for opening or closing the passage.

When the detection means detect the presence of at least two fluids in the inspected area, the control means can deliver to the controlled means a signal for opening or closing the passage.

The control means can deliver the signal for opening or closing the passage to the controlled means only after having processed the detection signals from all of the sensors.

The step of processing the detection signal may take into account a time period calculated as a function of the distance between the inspected area and the passage, and/or the viscosity of the fluid detected by the detection means in the inspected area.

The step of processing the detection signal may take into account the speed of displacement in the mixture of the fluid detected.

BRIEF DESCRIPTION OF DRAWINGS

The present invention may best be understood from reading the description of embodiments provided as an indication only and in no way limiting and by referring to the accompanying drawings in which.

Identical, similar or equivalent parts of the different figures described hereafter have the same number references so as to facilitate going from one figure to the next.

The different parts in the figures are not necessarily represented according to a uniform scale, in order to make the figures easier to read.

The different possibilities (alternatives and embodiments) must be understood as not being exclusive of each other and may be combined with each other.

DETAILED DESCRIPTION OF SPECIFIC EMBODIMENTS

Figure 1:
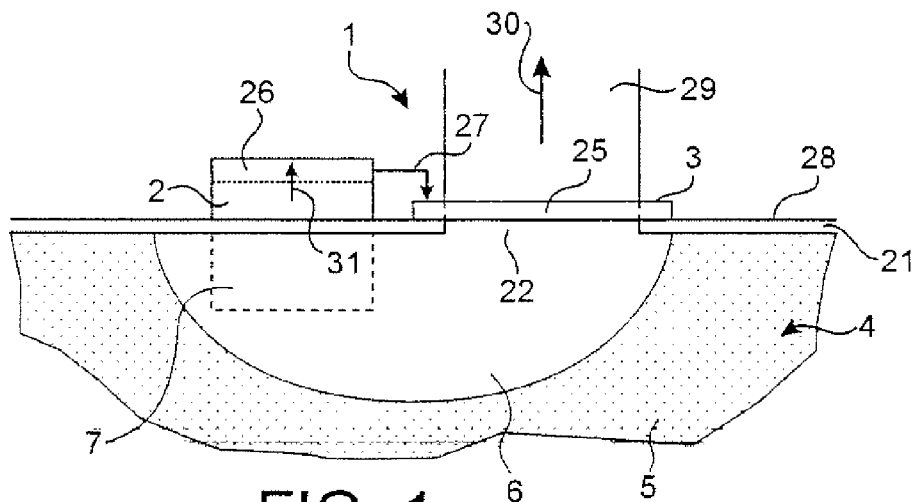
FIG. 1 represents a microsystem for separating fluids, subject of the present invention, according to a first embodiment.
Figure 3:
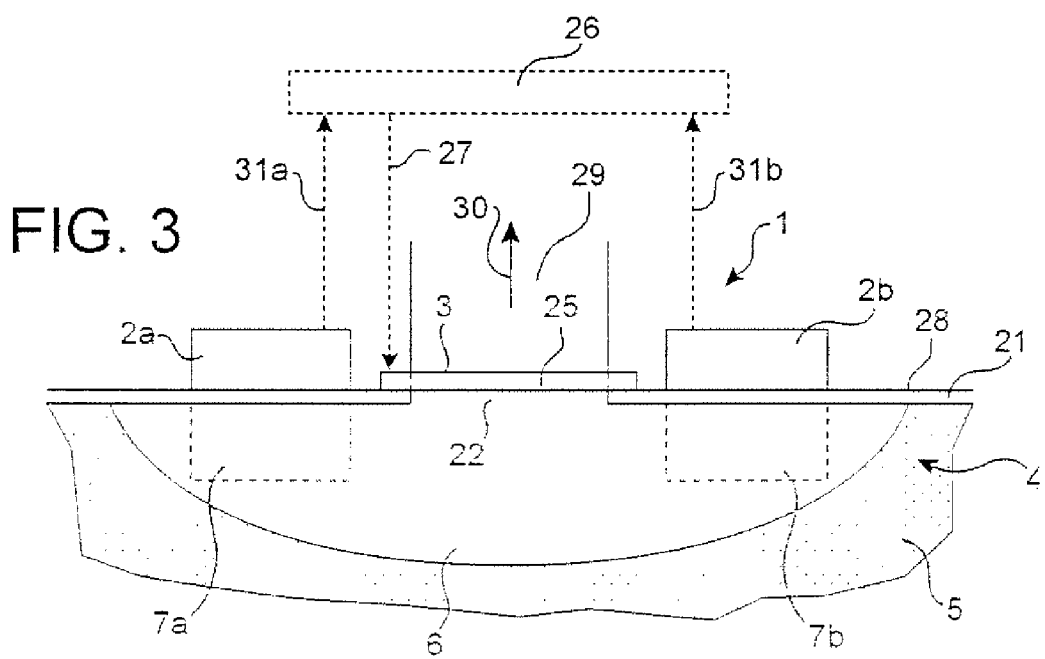
FIG. 3 represents a microsystem for separating fluids, subject of the present invention, according to a second embodiment.
Figure 4:
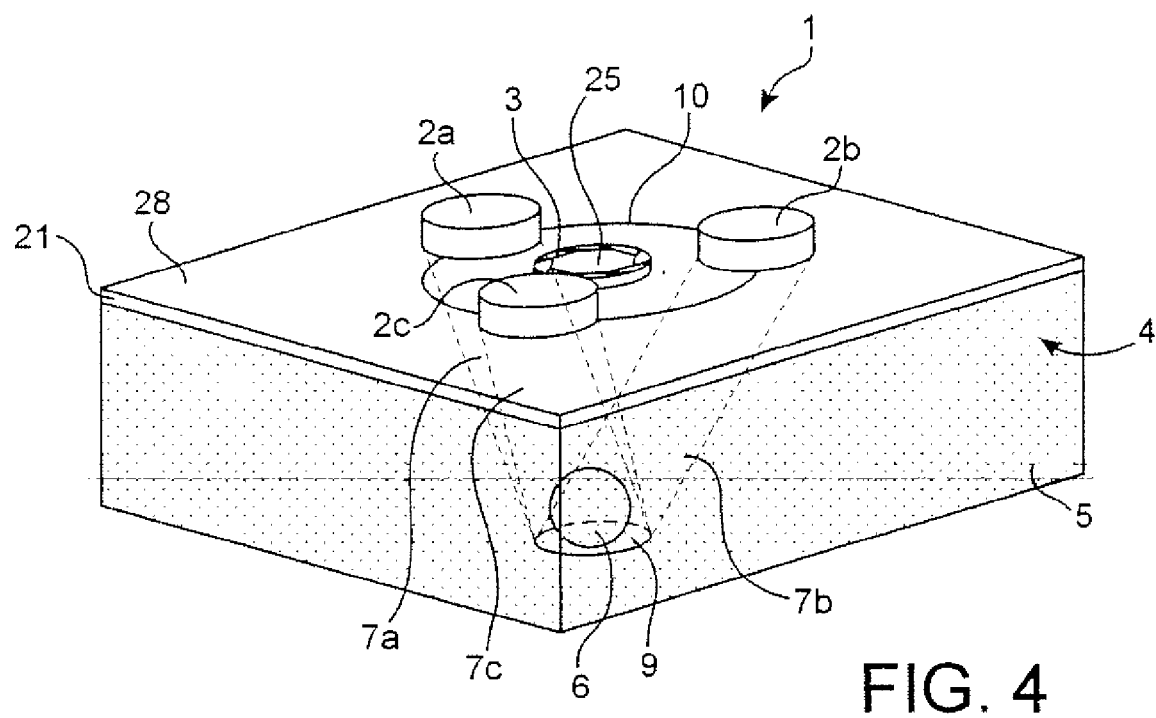
FIG. 4 represents a microsystem for separating fluids, subject of the present invention, according to a third embodiment.

Reference will firstly be made to FIG. 1 which represents a microsystem 1 for separating fluids 5, 6 according to a first embodiment. This active microsystem 1 is intended to separate the fluids 5, 6 not miscible with each other and contained in a mixture 4. In this first embodiment, as well as in all the other embodiments, the reference 6 designates the fluid that has to be "extracted" from the mixture 4. In the example described, the reference 5 represents a liquid and the reference 6 a gas. The gas 6 is present in the mixture 4 in the form of bubbles, but for reasons of simplification, a single gas bubble 6 is represented in FIGS. 1, 3 and 4. The mixture 4 could also comprise other fluids and/or materials in addition to the fluids 5, 6. In the example represented in FIG. 1, the microsystem 1 is intended to evacuate the gas bubble 6 present in the mixture 4 by separating it from the liquid 5. In another configuration, the fluid 6 could also be a liquid not miscible with the liquid 5.

Figure 2A:
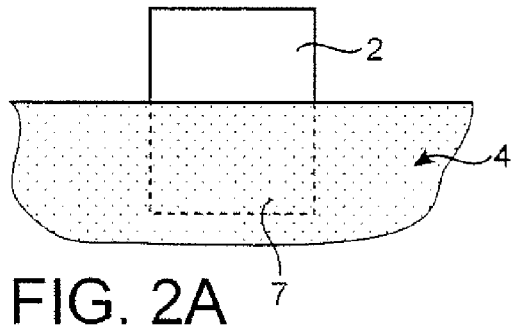
FIGS. 2A and 2B represent sensors for detecting fluids, used by a microsystem for separating fluids, subject of the present invention.
Figure 2B:
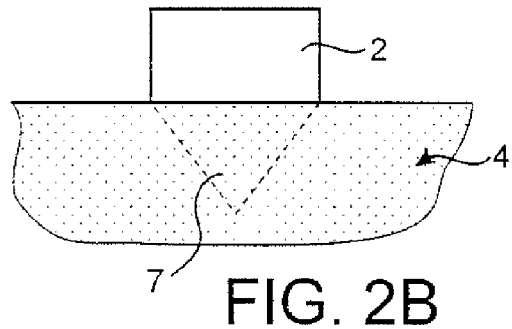

The microsystem 1 comprises at least one detection means 2 intended to inspect at least one area 7 of the mixture 4 and to detect the presence of at least one of the fluids 5, 6 in this area 7. The detection means 2 comprise a plurality of sensors. In this FIG. 1, only one sensor has been represented. In the remainder of the description in reference to FIG. 1, the detection means 2 will be assimilated to this sensor. The sensor 2 may, for example, be an ultrasound, optical, chemical sensor, or even a sensor based on the electrical or thermal conductivity of the fluid 5, 6 present in the inspected area 7. The technology for detecting the sensor 2 will be chosen as a function of the environment in which the microsystem 1 will operate. If, for example, the sensor 2 performs an optical measurement, the mixture 4 is then positioned in a structure enabling the passage of a light wave. The sensor 2 is capable of detecting, in the area 7 of the mixture 4 found for example in line with the sensor 2 as is represented in FIG. 1, the liquid 5 or the gas bubble 6. The area 7 inspected by the sensor 2 is defined by a shape and a volume that are specific to the type of sensor 2 used and which depend on the sensitivity of the sensor 2. For example, FIG. 2A represents a sensor 2 inspecting an area 7 of a mixture 4 of cylindrical shape. FIG. 2B represents a sensor 2 inspecting an area 7 of a mixture 4 of conic shape. The sensor 2 could also inspect an area 7 of the mixture 4 of different shape to those represented in FIGS. 2A and 2B. In FIG. 1, the microsystem 1 is arranged on one face 28 of a support 21. The gas bubble 6, which, in FIG. 1, is in contact with a face opposite to the face 28 of the support 21, is present in the inspected area 7. After the inspection of the area 7 of the mixture 4, the sensor 2 delivers a detection signal representative of the fluid 5, 6 detected in the inspected area 7.

The microsystem 1 further comprises at least one controlled means 3 for opening or closing a passage 25. In FIG. 1, the controlled means 3 are arranged near to the sensor 2. The other sensors, not represented in FIG. 1, of the microsystem 1 are arranged substantially around the controlled means 3. The controlled means 3 and the sensor 2 may be integral with a same substrate, for example here the support 21, or be fabricated in a disjointed manner then assembled on a same support. The opening or closing of the passage 25 is controlled by at least one control means 26. The control means 26 acquire the detection signal delivered by the sensor 2. The control means 26 then deliver a signal for opening or closing the passage 25 as a function of the detection signal delivered by the sensor 2. To do this, the control means 26 may comprise a control electronic, with for example an input connected to the sensor 2, on which is delivered the detection signal, an assembly for processing the detection signal, such as a microprocessor, and a "power" outlet connected to the controlled means 3, on which are delivered the signal for opening or closing the passage 25. In FIG. 1 the controlled means 3 are a valve, for example of diaphragm type. It can be seen in an open position in FIG. 4 and in a closed position in FIG. 5. A completely other type of valve, such as, for example, a curtain type valve, or more generally, a valve that can be controlled by the control means 26 and occupying a very small volume could also be envisaged. In FIG. 1, the control means 26 are integrated on the detection sensor 2. Furthermore, in FIG. 1, the passage 25 is arranged substantially facing a hole 22 passing through the support 21.

The operation of the microsystem 1 represented in FIG. 1 will be described with a single sensor for reasons of simplification. The operation of a microsystem with several sensors will be described below.

When the sensor 2 detects the presence of the liquid 5 in the area 7 of the mixture 4 inspected, a detection signal characteristic of the presence of the liquid 5 in the inspected area 7 is delivered by the sensor 2. The control means 26 then make an acquisition of this detection signal then processes it. This processing enables the control means 26 to interpret the detection signal and to decide to deliver a signal to the valve 3, for example for closing the passage 25, if it is wished to conserve the liquid 5 in the mixture 4. The signal delivered by the control means 26 may for example be a control voltage, that could be applied directly to the valve 3 if this is electrically actionable, or by the intermediary of an element (not represented) transforming this control voltage into a different control energy enabling the valve 3 (mechanical displacement, control fluid, etc.) to be actuated. Thus, the passage 25 being closed, the liquid 5 can not pass through it to be separated from the mixture 4.

When the sensor 2 detects the presence of the gas bubble 6 in the area 7 of the mixture 4 inspected, as is represented in FIG. 1, a detection signal, represented schematically in FIG. 1 by an arrow 31, indicating the presence of the gas bubble 6 in the inspected area 7, is delivered by the sensor 2. The control means 26 make the acquisition of this detection signal 31, process it, then deliver a signal for opening the passage 25 at the valve 3, represented schematically in FIG. 1 by an arrow 27. This opening signal 27 is of similar nature to the closing signal delivered during the detection of the liquid 5, here a control voltage. The passage 25 being in open position, the gas bubble 6 is separated from the liquid 5 by passing through the hole 22 and the passage 25, then is evacuated by means, for example, of an evacuation channel 29 communicating with the passage 25. The evacuation of the gas bubble 6 is represented by an arrow 30 in FIG. 1.

This dynamic operation of the microsystem 1 clearly illustrates the active character of the microsystem 1, unlike passive systems of the prior art operating in a quasi-static manner.

The dimensions of the passage 25 are adapted so that the fluid 6, whether it is in liquid or gaseous form, that has to pass through the passage 25, or that the fluid 5, that can accidentally pass through the passage 25, does not block this passage 25 due to capillarity forces. For example, the opening formed by the passage 25 when the valve 3 is open has a surface area of around 1 square millimeter. This surface area is sufficiently important so that one of the fluids 5, 6 does not block the passage 25. The dimensions of the passage 25 determine to a large extent the minimum size of the bubbles, in the case of a gas, or droplets in the case of a liquid, of the fluid 6 that can be evacuated without also risking evacuating the fluid 5. For example, in FIG. 1, the passage 25 is formed in such a way as to have an open surface area of around 1 square millimeter. The minimum size of the gas bubble 6 that may be evacuated without risking also evacuating the liquid 5 is therefore around 1 square millimeter (section of the gas bubble 6). It is possible to form a passage 25 of smaller dimensions, for example having a surface of around 1 square micrometer or even of smaller dimensions. Such dimensions are used preferably if the fluids 5, 6 can pass through the passage 25 without blocking it.

The displacement of the fluid 6 to pass through the passage 25 may be due to a natural movement. For example, in the case of a separation of two liquids of different densities, the densest "falls" to the bottom of the mixture. If a microsystem of the present invention is positioned at the level of the base of the mixture, the densest liquid will naturally pass through the passage of the microsystem when this will be open. In the same way, in the case of a separation of a gas and a liquid, if the gas has a tendency to rise naturally in the mixture and that a microsystem is positioned above the mixture, the gas will naturally pass through the passage of the microsystem when it is open. It may also be envisaged using exterior phenomena to evacuate the fluid 6 through the passage 25. For example, in FIG. 1, the pressure present in the mixture 4 is higher than that present in the evacuation channel 29. Thus, when the fluid 6 has been detected by the sensor 2 and when the valve 3 opens, the fluid 6 is evacuated in the evacuation channel 29 thanks to this pressure difference. Other means, such as the application of an electric field during an electrophoresis or an electroosmosis, may be used during the separation of the fluids 5, 6. Finally, it is also possible to use a pump that makes it possible to circulate the mixture 4 in a circuit exterior to the recipient containing the mixture 4. At least one microsystem 1, arranged along the circuit, thereby enables the separation of the fluids 5, 6 to be carried out by extracting the fluid 6 from the mixture 4.

When the area 7 inspected by the sensor 2 contains both the gas 6 and the liquid 5, the behaviour of the control means 26 depends on the separation strategy adopted by the user of the microsystem 1. If it is desired, for example, to collect the gas 6 without being concerned about the liquid 5, it will be tolerated that a small amount of gas 6 remains mixed with the liquid 5. This results in the sending of a signal for closing the passage 25 as soon as the sensor 2 detects the liquid 5 alone or a mixture of gas 6 and liquid 5. The signal for opening the passage 25 is only delivered when the sensor 2 uniquely detects the gas 6. If it is wished on the other hand to conserve the liquid 5 while evacuating all of the gas 6, it will be tolerated that a small amount of liquid 5 accidentally passes through the passage 25 during the evacuation of the gas 6. This results in the sending of a signal for opening the passage 25 as soon as the sensor 2 detects the gas 6 alone or a mixture of gas 6 and liquid 5. The signal for closing the passage 25 is then delivered when the sensor 2 only detects the liquid 5.

Supplementary parameters may also be taken into account by the control means 26 in addition to the signal for detecting the presence of one of the fluids 5, 6 in the inspected area 7. Firstly, the distance between the inspected area 7 and the passage 25 may be taken into account to determine a time lag between the reception of the detection signal from the sensor 2 and the sending of the opening or closing signal to the valve 3 by the control means 26. The viscosities of the fluids 5, 6 can also be taken into account for the calculation of this time lag since the speed at which the fluid 6 passes through the passage 25 depends on it. The speed at which the fluid 6 moves in the mixture 4 may also be taken into account.

Figure 6:
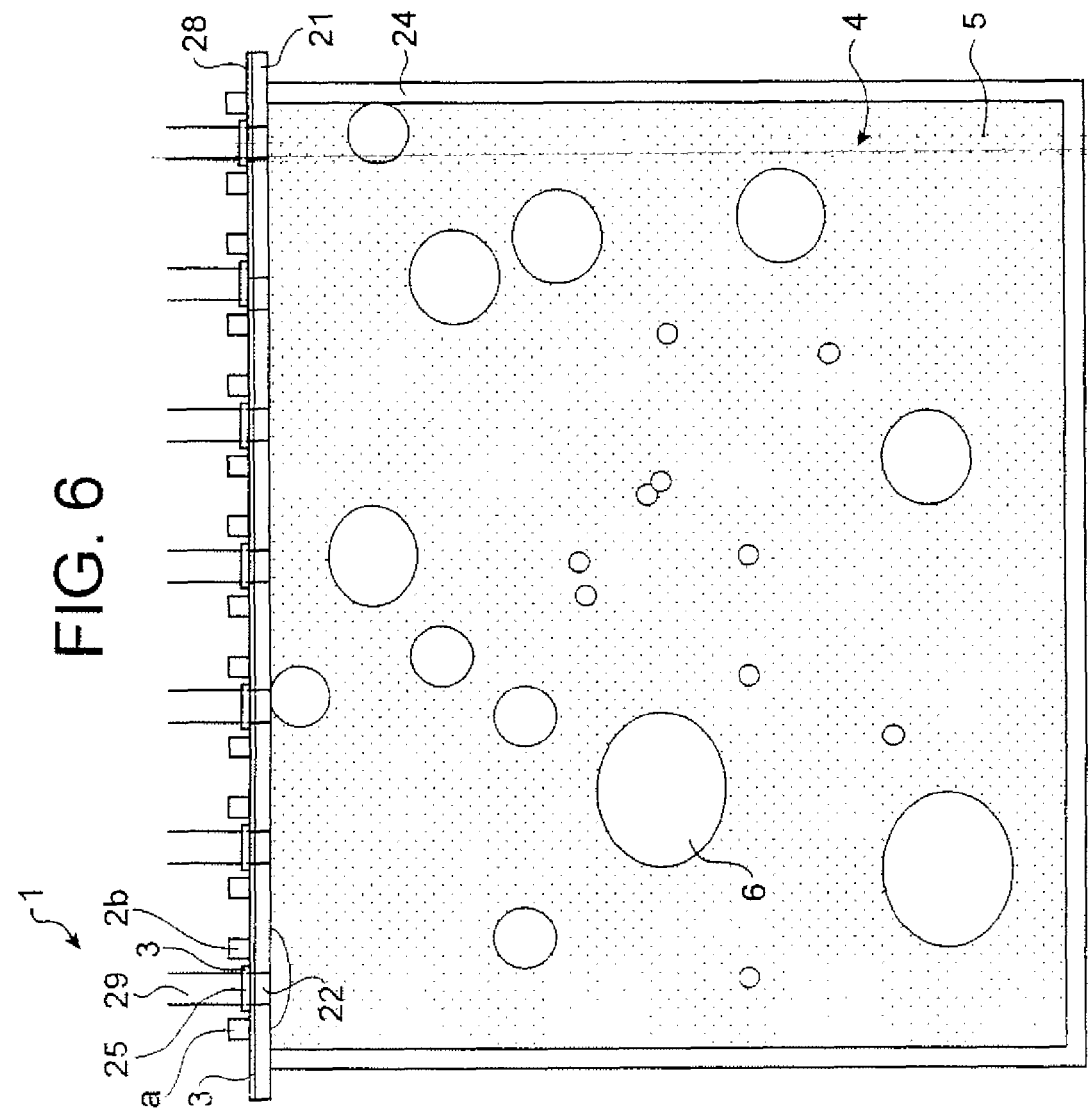
FIG. 6 represents a device for separating fluids, subject of the present invention, according to a first embodiment.

The microsystem 1, for example formed in MEMS (Micro Electro Mechanical System) or micro-TAS (Micro Total Analysis System) technology, is obtained for example by etching, such as a chemical or laser etching, or by machining of a substrate 23, visible in FIG. 6, of semi-conductor or polymer base. This semi-conductor may, for example, be silicon. The material will be chosen as a function of the fluids that the mixture 4 comprises. Preferably, the fluids 5, 6 are not corrosive for the material of the microsystem 1. During the fabrication of the microsystem 1, all of the elements may be fabricated on a same substrate, thereby forming a completely integrated microsystem 1, the different elements 2, 3 and 26 being already connected to each other (electrical, mechanical connections, etc.). These elements 2, 3 and 26 may also be formed separately and then mechanically and electrically linked with each other on a common support to form the microsystem 1.

FIG. 3 represents a microsystem 1 for separating fluids 5, 6, according to a second embodiment. In this FIG. 3, the controlled means 3 for opening or closing the passage 25 are substantially similar to that of FIG. 1. The microsystem comprises two sensors 2a, 2b for detecting fluids 5, 6. The control means 26 are not integrated on one of the sensors 2a, 2b. The sensors 2a, 2b may, for example, be substantially similar to the sensor 2 of FIG. 1. Each of the sensors 2a, 2b, is intended to inspect an area 7a, 7b of the mixture 4. The sensors 2a, 2b are arranged on either side of the valve 3. In this second embodiment, the sensors 2a, 2b are arranged substantially on a circle, not represented in FIG. 3, having for centre the valve 3, and more precisely on a same diameter of this circle. Each of the sensors 2a, 2b delivers a detection signal representative of the fluid 5, 6 detected in their respective area of inspection 7a, 7b. In FIG. 3, a gas bubble 6 is present in the two areas 7a, 7b inspected. A signal for opening the passage 25, represented schematically in FIG. 3 by an arrow 27, is therefore delivered to the valve 3 by the control means 26 after having processed the detection signals 31a, 31b indicating the presence of the gas bubble 6 in the inspected areas 7a, 7b. When the two sensors 2a, 2b detect the presence of liquid 5 in the inspected areas 7a, 7b, a signal for closing the passage 25 is delivered to the valve 3 by the control means 26. When one of the two sensors 2a, 2b detects the presence of a gas bubble 6 and the other the liquid 5, or that a mixture of these two fluids 5, 6 is detected by one and/or the other of two sensors 2a, 2b, the control means 26 can deliver a signal for opening or closing the passage 25 depending on the separation strategy chosen by the user, as is explained in the description of the first embodiment.

As in the first embodiment supplementary parameters may also be taken into account by the control means 26 in addition to the information for detecting the presence of one of the fluids 5, 6 in the inspected areas 7a, 7, such as the distances between the areas 7a, 7b and the passage 25, the viscosity of the fluid 6 and the speed with which the fluid 6 moves in the mixture 4. The microsystem 1 of FIG. 3 can calculate the speed of displacement of the fluid 6 in the mixture 4 along the direction connecting the two sensors. The calculation of this speed is carried out by the control means 26. The control means 26 take into account the distance between the two sensors 2a, 2b and the instant of detection of a same fluid, here the fluid 6, of the mixture 4 by each of the sensors 2a, 2b. With a microsystem 1 comprising two sensors 2a, 2b, the sensors are preferably relatively near so as to be able to consider that the speed of the gas bubble 6 is linear and that the changes in speed of displacement of the gas bubble 6 are not abrupt.

In the first two embodiments, a very small amount of liquid 5 can nevertheless accidentally pass through the passage 25 when it is open. The microsystem 1 comprising two sensors 2a, 2b, like that of the second embodiment, makes it possible to detect the presence of the fluid 6 when it is positioned in line with the valve 3. Thus, a microsystem 1 comprising two sensors 2a, 2b, like that represented in FIG. 3, makes it possible to limit the quantity of fluid 5 that can accidentally pass through the passage 25 when it is open, compared to a microsystem only using a single sensor. In the second embodiment, a gas bubble 6 is detected by the two sensors 2a, 2b and therefore extends from one sensor 2a to the other 2b. It is also possible to configure the microsystem 1 in such a way that the passage 25 opens when one or the other of the two sensors 2a, 2b detects a gas bubble 6. In this case, the minimum size of a gas bubble 6 that can be separated from the liquid 5 is identical to that which can be separated by a microsystem comprising a single sensor.

The techniques for forming the microsystem 1 according to the second embodiment may be similar to those used for the formation of the microsystem 1 according to the first embodiment.

It may also be envisaged that the active microsystem 1 comprises more than two detection sensors 2a, 2b. FIG. 4 represents a microsystem 1 for separating fluids 5, 6, according to a third embodiment. The controlled means 3 for opening or closing the passage 25 are substantially similar to those of the two previous embodiments. The microsystem 1 further comprises three sensors 2a, 2b, 2c for detecting fluids 5, 6, substantially similar to those of the previous embodiments. The sensors 2a, 2b, 2c are arranged on a circle 10, the centre of which is the valve 3, and form the summits of an equilateral triangle inscribed in the circle 10. The control means are not represented in this FIG. 4 with a view to simplification. In this FIG. 4, the diaphragm type valve 3 is represented in open position. Each of the sensors 2a, 2b, 2c inspects an area 7a, 7b, 7c of the mixture 4. A signal for opening the passage 25 is delivered by the control means 26 when the three sensors 2a, 2b and 2c have detected the presence of a gas bubble 6 in the areas 7a, 7b and 7c of the mixture 4. It may be observed that in this FIG. 4, the areas 7a, 7b, 7c of the mixture 4 inspected, which all have a cylindrical shape, cross in a region 9 centred in line with the valve 3. Thus, the signal for opening the passage 25 is only delivered when the gas bubble 6 is positioned in line with the valve 3, in the region 9 of intersection common to the three inspected areas 7a, 7b, 7c of the mixture 4. When the three sensors 2a, 2b, 2c detect the presence of liquid 5 in the three inspected areas 7a, 7b, 7c, a signal for closing the passage 25 is delivered to the valve 3 by the control means 26. When one of the three sensors, for example 2a, detects the presence of a gas bubble 6 and that the two other sensors 2b, 2c, detect the liquid 5, the control means 26 can deliver a signal for opening or closing the passage 25 depending on the separation strategy chosen by the user, as is explained in the first embodiment. The same is true when at least one of the three sensors 2a, 2b, 2c detects a mixture of two fluids 5, 6. The microsystem 1 according to this third embodiment makes it possible to even further limit the amount of liquid 5 that can accidentally pass through the passage 25 of the valve 3 when it is open, compared to the microsystems 1 of the two previous embodiments. Finally, this microsystem 1 according to the third embodiment also enables the measurement of the speed of the gas bubble 6 in the mixture 4 to be refined. The techniques for forming the microsystem 1 according to the third embodiment may be similar to those used for the formation of the microsystem 1 according to the first embodiment.

Figure 5:
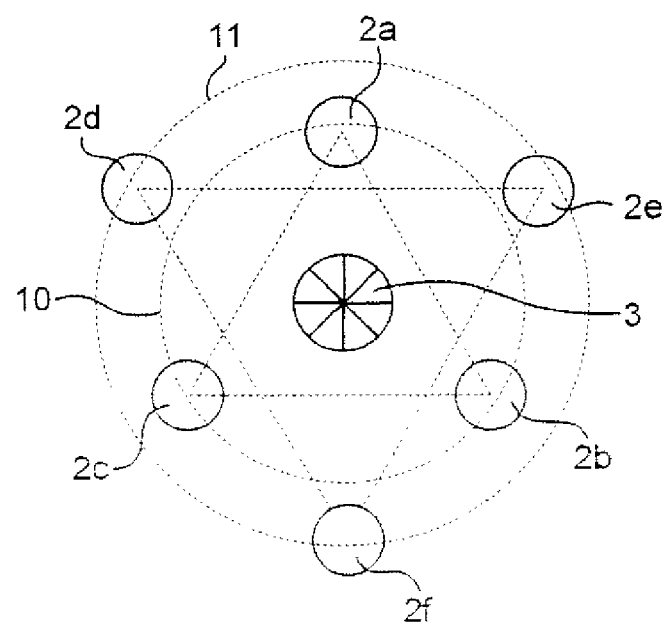
FIG. 5 represents a microsystem for separating fluids, subject of the present invention, according to a fourth embodiment.

FIG. 5 represents a microsystem 1 for separating fluids 5, 6 according to a fourth embodiment. The controlled means 3 for opening or closing a passage 25 are here a valve substantially similar to those of the three previous embodiments. The control means are not represented in this FIG. 5, with a view to simplification. The detection means here comprise six sensors 2a to 2f for detecting fluids 5, 6, substantially similar to those of the previous embodiments. In this fourth embodiment, the sensors 2a to 2f are arranged substantially on concentric circles 10 and 11 of different diameters and having for centre the valve 3. The first three sensors 2a, 2b, 2c are arranged on the first circle 10 and the three other sensors 2d, 2e, 2f on the second circle 11. The second circle 11 has a diameter greater than that of the first circle 10. In this fourth embodiment, the sensors arranged on a same circle form the summits of a regular polygon. The first three sensors 2a, 2b and 2c form the summits of an equilateral triangle inscribed in the circle 10, and the three other sensors 2d, 2e and 2f form the summits of an equilateral triangle inscribed in the circle 11. The sensors 2a to 2f of different circles are radially offset two by two. The operation of the microsystem 1 according to the fourth embodiment is identical to that of the microsystem 1 according to the third embodiment, the detections not applying to three but to six sensors 2a to 2f. In addition to having advantages substantially similar to those of the third embodiment, the microsystem 1 according to this fourth embodiment makes it possible to obtain information on the speed of displacement of the gas bubble 6 no longer along a straight line but in a plane that is delimited by the areas of detection 7a to 7f. The techniques for forming the microsystem 1 according to the fourth embodiment may be similar to those used for the formation of the microsystem 1 according to the first embodiment.

Multiple configurations are possible for forming a microsystem 1 detecting the position and the speed of displacement of a gas bubble 6, the conditions being that the detection means 2 of the microsystem 1 comprise several sensors in a plane and that the sensors, the coordinates of which in the plane are known, are positioned in such a way that the combination of information supplied by the sensors is relevant for the determination of the position and the speed of the gas bubble 6.

The present invention further concerns a device 20 for separating fluids 5, 6 not miscible with each other and contained in a mixture 4. The device 20 comprises at least one support 21. This support 21 may be based on any type of material: textile, metal, synthetic, plastic, semi-conductor, etc. The device 20 further comprises at least one microsystem 1 for separating fluids 5, 6, arranged on one face 28 of the support 21. The support 21 may be in contact with the mixture 4. FIG. 6 represents a device 20 according to a first embodiment. This device 20 makes it possible to separate the fluid 6, here in the form of bubbles of gas and liquid 5, both present in the mixture 4. In FIG. 6, the support 21 is a cover arranged on a recipient 24 containing the mixture 4. In FIG. 6, several microsystems 1 are integrated on the support 21. The microsystems 1 may be substantially similar to those of one of the embodiments described above. In FIG. 6, each microsystem 1 comprises a controlled means 3 for opening or closing a passage 25, here a valve, at least one means for detecting fluids 5, 6, here sensors 2a, 2b, for example ultrasound sensors, and a control means not represented in this FIG. 6. The microsystems 1 of the device 20 of FIG. 6 are therefore substantially similar to the microsystem 1 of FIG. 3. Each valve 3 of one of the microsystems 1 is arranged facing a hole 22 passing through the support 21. The operation of each microsystem 1 may for example be similar to the operation of the microsystem of FIG. 3 described above in the description. In this first embodiment of the device 20, an excess pressure is created in the recipient 24, making it possible to evacuate the bubbles of gas 6 through an evacuation channel 29 when one of the passages 25 opens. The device 20 according to the first embodiment is formed from a silicon substrate 23 in which the microsystems 1 for separating fluids 5, 6 have been etched, for example by laser etching. The techniques of forming microsystems 1 may be similar to those used for the formation of the microsystem 1 according to the first embodiment. The device 20 may comprise up to several thousand microsystems 1 integrated on the support 21. The number of microsystems 1 and their positions depend on the device 20. For example, if the fluid 6 is positioned in a random manner in the mixture 4, the microsystems 1 will be uniformly distributed on the support 21. On the other hand, if the fluid 6 is positioned at preferential spots in the mixture 4, the microsystems 1 are concentrated towards these preferential spots. The number of microsystems 1 to be integrated in the support 21 is also directly proportional to the speed desired to carry out this separation of fluids 5, 6. These characteristics and others provide constraints that are taken into account when the device 20 is designed.

Figure 7:
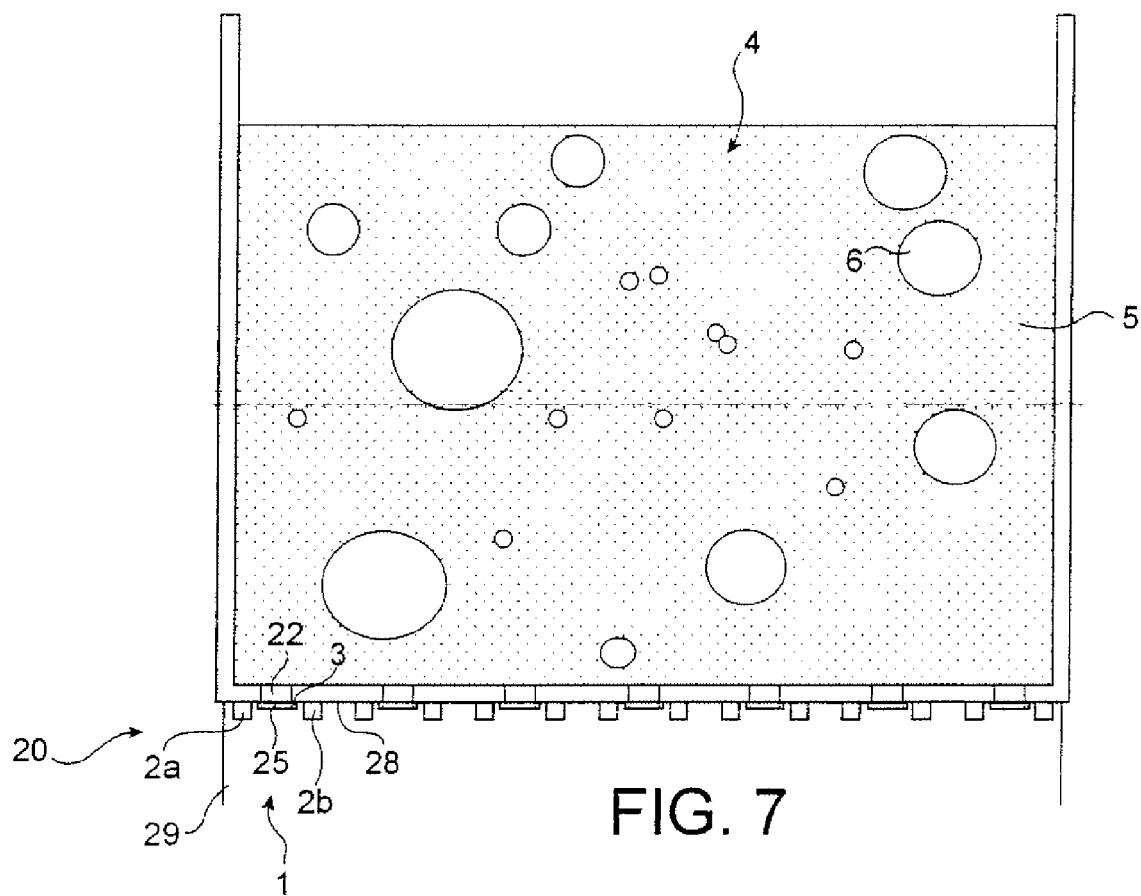
FIG. 7 represents a device for separating fluids, subject of the present invention, according to a second embodiment.

FIG. 7 represents a device 20 for separating fluids according to a second embodiment. In this second embodiment, the device 20 is a recipient intended to contain a mixture 4 composed of a first liquid 5 and a second liquid 6 to be separated from the liquid 5. The recipient 20 comprises microsystems 1, substantially similar to those described for the device 20 according to the first embodiment. These microsystems 1 are arranged on a support 21, here the base of the recipient 20. The microsystems 1 are firstly fabricated from a substrate, for example silicon based, then individually cut up, and finally fixed with adhesive, by welding, or by molecular adhesion against the base 21, for example outside the recipient 20. Here, since the second liquid 6 is denser than the first liquid 5, the second liquid 6 naturally "falls" towards the base 21 of the recipient 20. The base 21 further comprises holes 22 opposite which are placed the passages 25 of the microsystems 1. In this device 20, a single evacuation channel 29, shared by all of the microsystems 1, makes it possible to evacuate the second liquid 6 when it is separated from the mixture 4. The operation of the microsystems 1 (opening and closing of the passage 25) of the device 20 according to this second embodiment is substantially similar to that described above for the microsystems 1 of the device 20 according to the first embodiment.

Figure 8:
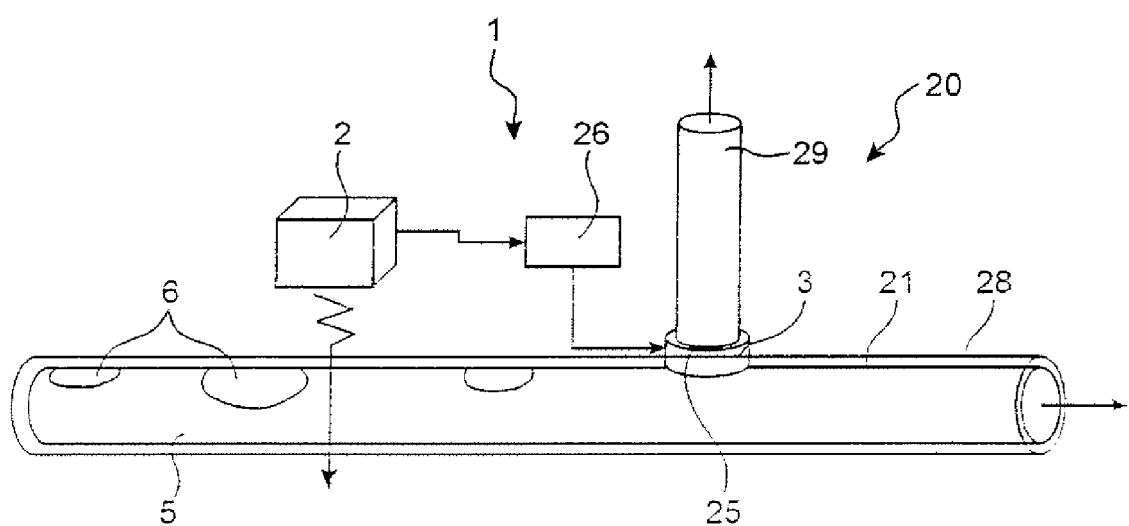
FIG. 8 represents a device for separating fluids, subject of the present invention, according to a third embodiment.

FIG. 8 represents a device 20 for separating fluids 5, 6 according to a third embodiment. In this third embodiment, the device 20 comprises a pipe, such as a capillary pipe, in which flows a mixture 4. The mixture 4 comprises a liquid 5 and gas bubbles 6. The device 20 comprises a support 21 that is here a wall of the pipe. On this wall 21 of the pipe are arranged several microsystems 1, substantially similar to one of those described previously. In FIG. 8, a single microsystem 1 is represented. The microsystem 1 of FIG. 8 is for example substantially similar to that used by the device 20 according to the first embodiment, in FIG. 6.

Although several embodiments of the present invention have been described in a detailed manner, it will be understood that different changes and modifications may be made without going beyond the scope of the invention.

The invention claimed is:

1. A microsystem for separating fluids not miscible with each other and contained in a mixture, comprising:
   at least one detection means intended to inspect at least one area of the mixture and to detect the presence of at least one of the fluids in this area,
   at least one controlled means for opening or closing a passage,
   at least one control means for the opening or the closing of the passage as a function of the nature of the fluid detected in the at least one area inspected by the detection means, in such a way that the fluid whose presence has been detected flows or not through the passage,
   each of the at least one detection means comprising a plurality of sensors arranged in a coplanar fashion surrounding one of the at least one controlled means.

2. The microsystem according to claim 1, the fluids being a gas and a liquid, or two liquids.

3. The microsystem according to claim 1, wherein the at least one controlled means is a microelectromechanical system.

4. The microsystem according to claim 1, the controlled means comprising a valve selected from the group consisting of a diaphragm or curtain type valve.

5. The microsystem according to claim 1, the controlled means being arranged adjacent to the detection means.

6. The microsystem according to claim 1, the one or more detection means each comprising at least one sensor, based on the measurement of electrical or thermal, optical or chemical conductivity.

7. The microsystem according to claim 1, at least one of the at least one control means being integrated in one of the at least one detection means.

8. The microsystem according to claim 1, the sensors for at least one of the one or more detection means being arranged on one or more concentric circles of different diameters and having for centre one of the one or more controlled means.

9. The microsystem according to claim 8, wherein the sensors for at least one of the one or more detection means are arranged on a same circle being on a diameter of the circle, or that form the summits of a regular polygon inscribed in the circle.

10. The microsystem according to claim 8, the sensors for at least one of the one or more detection means being placed on different circles being offset radially two by two.

11. The microsystem according to claim 1, wherein the at least one controlled means comprises an etched channel.

12. The microsystem according to claim 1, further comprising a substrate selected from the group consisting of silicon or a polymer, wherein the at least one detection means, the at least one controlled means, and at least one control means are formed on the substrate.

13. A device for separating fluids not miscible with each other and contained in a mixture, comprising at least one microsystem according to claim 1 and a support, the microsystem being arranged on a face of the support.

14. The device according to claim 13, the passage of the microsystem being arranged opposite a hole passing through the support.

15. The device according to claim 13, the microsystem being fixed by welding, with adhesive, or by molecular adhesion, on the face of the support.

16. The device according to claim 13, said device being a recipient intended to contain the mixture, the support being at least one wall of this recipient.

17. The device according to claim 16, the microsystem being arranged outside of the recipient.

18. The device according to claim 13, the support being a cover, intended to cover a recipient containing the mixture.

19. The device according to claim 13, this device being a pipe in which the mixture is intended to circulate, the support being at least one wall of said pipe.

20. A method for separating fluids, not miscible with each other and contained in a mixture, by means of a microsystem according to claim 1, comprising:
   a step of detecting the presence of at least one fluid in the area of the mixture intended to be inspected by the at least one detection means,
   a step of acquiring by the at least one control means at least one detection signal for the presence of the at least one fluid in the inspected area, delivered by the at least one detection means,
   a step of processing the at least one detection signal by the at least one control means, which then deliver to the at least one controlled means a signal for opening or closing the passage as a function of the at least one detection signal received, and
   a step for opening or closing the passage by the at least one controlled means as a function of the signal received for opening or closing the passage.

21. The method for separating fluids according to claim 20, in which, when the at least one detection means detect the presence of at least two fluids in the inspected area, the at least one control means deliver to the at least one controlled means a signal for opening the passage.

22. The method for separating fluids according to claim 20, in which, when the at least one detection means detect the presence of at least two fluids in the inspected area, the at least one control means deliver to the at least one controlled means a signal for closing the passage.

23. The method for separating fluids according to claim 20, in which the at least one control means deliver the signal for opening or closing the passage to the at least one controlled means only after having processed the at least one detection signal from all of the plurality of sensors.

24. The method for separating fluids according to claim 20, the step of processing the at least one detection signal taking into account a delay calculated as a function of the distance between the inspected area and the passage, and/or the viscosity of the fluid detected by the at least one detection means in the inspected area.

25. The method for separating fluids according to claim 20, in which the step of processing the at least one detection signal takes into account the speed of displacement in the mixture of the at least one fluid detected.

* * * * *